United States Patent
McGuire, Jr. et al.

(10) Patent No.: US 9,790,318 B2
(45) Date of Patent: Oct. 17, 2017

(54) METHODS FOR POLYMERIZING FILMS IN-SITU

(75) Inventors: James E. McGuire, Jr., Westerville, OH (US); Michael Lee Owens, Circleville, OH (US); Andrew C. Strange, Worthington, OH (US)

(73) Assignee: entrotech, inc, Columbus, OH (US)

( * ) Notice: Subject to any disclaimer, the term of this patent is extended or adjusted under 35 U.S.C. 154(b) by 234 days.

(21) Appl. No.: 13/056,980

(22) PCT Filed: Sep. 25, 2009

(86) PCT No.: PCT/US2009/058500
§ 371 (c)(1),
(2), (4) Date: Feb. 1, 2011

(87) PCT Pub. No.: WO2010/036981
PCT Pub. Date: Apr. 1, 2010

(65) Prior Publication Data
US 2011/0137006 A1    Jun. 9, 2011

(51) Int. Cl.
| | | |
|---|---|---|
| *C08G 18/28* | (2006.01) | |
| *C08G 18/75* | (2006.01) | |
| *C08G 18/32* | (2006.01) | |
| *C08G 18/42* | (2006.01) | |
| *C08G 18/66* | (2006.01) | |
| *C08J 5/18* | (2006.01) | |
| *C08G 18/08* | (2006.01) | |

(52) U.S. Cl.
CPC ....... *C08G 18/758* (2013.01); *C08G 18/0895* (2013.01); *C08G 18/3206* (2013.01); *C08G 18/4277* (2013.01); *C08G 18/664* (2013.01); *C08J 5/18* (2013.01); *C08J 2375/04* (2013.01)

(58) Field of Classification Search
None
See application file for complete search history.

(56) References Cited

U.S. PATENT DOCUMENTS 3,539,424 A    11/1970    Tashlick
3,689,346 A    9/1972    Rowland
(Continued)

FOREIGN PATENT DOCUMENTS

GB    2021599    12/1979
GB    1 590 413    6/1981
(Continued)

OTHER PUBLICATIONS

"Argotec 49510 Technical Data Sheet," Argotec, Inc. (Greenfield, MA)—http://www.argotec.com/techsheets/Argotec%2049510.pdf, (Oct. 2003).
(Continued)

*Primary Examiner* — Jeffrey Washville
(74) *Attorney, Agent, or Firm* — The Griffith Law Firm, A P.C.; Lisa M. Griffith

(57) ABSTRACT

A method for formation of a polymer film in-situ according to the invention comprises steps of: providing a polymerizable composition in one or multiple parts; initiating polymerization of the polymerizable composition to form a polymerizing composition; prior to completion of polymerization of the polymerizable composition, forming a film therefrom; and fully polymerizing the polymerizing composition to form the polymer film.

27 Claims, 3 Drawing Sheets

(56) References Cited

U.S. PATENT DOCUMENTS

| | | | |
|---|---|---|---|
| 3,695,972 A * | 10/1972 | Lind | D06N 3/0088 156/190 |
| 4,034,708 A | 7/1977 | Fielder et al. | |
| 4,131,602 A | 12/1978 | Hodakowski et al. | |
| 4,181,752 A | 1/1980 | Martens et al. | |
| 4,207,356 A | 6/1980 | Waugh | |
| 4,292,827 A | 10/1981 | Waugh | |
| 4,302,550 A | 11/1981 | Pisaric et al. | |
| 4,332,074 A * | 6/1982 | Auld et al. | 29/527.4 |
| 4,590,218 A | 5/1986 | Vass | |
| 4,649,162 A | 3/1987 | Roche et al. | |
| 4,652,494 A * | 3/1987 | Bravet et al. | 428/423.1 |
| 4,816,542 A | 3/1989 | Liebl et al. | |
| 5,148,574 A * | 9/1992 | Leclere et al. | 15/415.1 |
| 5,155,201 A * | 10/1992 | Gardon | C08G 18/3206 525/456 |
| 5,183,597 A * | 2/1993 | Lu | 264/1.38 |
| 5,260,095 A | 11/1993 | Affinito | |
| 5,403,615 A | 4/1995 | Winkler et al. | |
| 5,428,087 A | 6/1995 | Petit et al. | |
| 5,691,846 A | 11/1997 | Benson et al. | |
| 6,045,864 A | 4/2000 | Lyons et al. | |
| 6,191,221 B1 * | 2/2001 | McAmish et al. | 525/131 |
| 7,074,463 B2 * | 7/2006 | Jones et al. | 428/1.1 |
| 7,138,466 B2 | 11/2006 | Hung et al. | |
| 7,151,151 B2 | 12/2006 | Richter et al. | |
| 7,157,527 B2 | 1/2007 | Kuntimaddi et al. | |
| 7,157,572 B2 | 1/2007 | Lee | |
| 7,160,973 B2 | 1/2007 | Ohrbom et al. | |
| 8,013,099 B2 * | 9/2011 | Poppe et al. | 528/28 |
| 8,828,303 B2 | 9/2014 | McGuire et al. | |
| 2002/0132049 A1 * | 9/2002 | Leonard et al. | 427/256 |
| 2003/0075264 A1 | 4/2003 | Terakado et al. | |
| 2003/0138842 A1 * | 7/2003 | Seul et al. | 435/7.1 |
| 2003/0148044 A1 | 8/2003 | Auld et al. | |
| 2005/0137375 A1 | 6/2005 | Hansen et al. | |
| 2008/0026233 A1 | 1/2008 | Kunz et al. | |
| 2009/0297724 A1 | 12/2009 | Weber | |
| 2011/0241261 A1 | 10/2011 | McGuire et al. | |
| 2015/0166831 A1 | 6/2015 | Kuehneweg et al. | |

FOREIGN PATENT DOCUMENTS

| | | | |
|---|---|---|---|
| GB | 2194951 A | | 3/1988 |
| WO | WO2007/033786 | * | 3/2007 |

OTHER PUBLICATIONS

Hackett, Earl T., "Film Inspection Using Cross-Polarized Light: The Old Method Can Give New Life to Film Inspection Procedures," *Pharmaceutical & Medical Packaging News*—http://www.devicelink.com/pmpn/archive/04/07/004.html, (Jul. 2004).

* cited by examiner

METHODS FOR POLYMERIZING FILMS IN-SITU

CROSS-REFERENCE TO RELATED APPLICATIONS

This application is a U.S. National Stage of PCT Patent Application No. PCT/US09/58500, filed on Sep. 25, 2009, which claims the benefit of U.S. Provisional Patent Application No. 61/100,689, filed on Sep. 26, 2008.

BACKGROUND OF THE INVENTION

The present invention is directed toward methods for polymerizing compositions in-situ such that polymer films are formed therefrom.

Polymeric materials (also referred to herein simply as "polymers") are used in many applications. Polymeric materials can be formed into a wide variety of shapes suitable for their intended application. Some applications impose more stringent requirements on dimensions or other properties of materials used than others. For example, optical clarity of polymeric materials is an important consideration when selecting polymeric materials for use in optical applications. As a further example, many applications require that polymeric materials used therein consist of single layer films having controlled dimensions.

A "film" is generally understood to be a relatively thin, continuous, single layer of material. In contrast, many conventionally applied "coatings" do not form a continuous or uniform layer of material on an underlying substrate. As such, coatings (e.g., vapor coatings and ink jet-printed coatings) are often not able to be physically separated from the supporting substrate on which they are formed so that they can be used as a stand-alone layer or as one of multiple layers in another application. Thus, such coating technology has its limitations and is generally deficient for formation of polymeric films.

U.S. Pat. No. 4,207,356 describes one application of coating technology. Disclosed therein is a method of coating glass containers with a layer of plastic. Using the methods therein, uncured polyurethane liquid plastic is mixed and metered in predetermined amounts to each nozzle means and cast from separate nozzle means as the bottle is rotated at approximately 40-60 revolutions per minute beneath the nozzle means. According to the methods therein, liquid plastic is said to be flow-coated to a thickness of 100-250 microns per bottle, sometimes using multiple passes to obtain the desired coating thickness. After the coating is cast onto the bottle, the coated bottle is moved to a curing zone for a curing step.

Similarly, U.S. Pat. No. 4,034,708 describes a casting operation for making plastic emblems. As described therein, an operator applies measured portions of a plastic material, such as liquid polyurethane, to the upper surface of a substrate. Preferred are polyurethane resins to which a catalyst is added just prior to casting in order to initiate a curing reaction. Further, an infrared radiation source may be provided to irradiate the polyurethane in order to rapidly drive off volatile liquids present in the liquid polyurethane and promote curing of the composition. Also discussed therein is the possibility of irradiating the substrates prior to casting, thereby reducing the viscosity of the cast plastic as it flows onto the substrate. This is said to allow for more even flow over larger substrates. Whatever method is used, however, an objective discussed throughout this patent is the prevention of plastic material from flowing over the edge of the emblem on which it is applied; thus, it is stated that it is important to hold the substrate flat during the entire casting and curing process.

See also U.S. Patent Publication No. 2003/0148044, which discusses plastic emblems having an enhanced depth of vision. In addition to a layer of plastic material therein, such emblems contain a transparent plastic overlay flow-coated over the image or design therein. It is stated that one preferred plastic material is polyurethane comprising the reaction product of: (A) a polyester glycol and low to medium molecular weight polypropylene triols, and (B) aliphatic diisocyanatepolypropylenetriol adduct. After mixing (A) and (B), the mixture is cast onto a decorative substrate to form a radiused edge based on the flow pattern, after which time it is cured by radiation. Gel times of such polyurethanes are selected to be approximately 4 minutes to 7 minutes. It is stated that preferably a catalyst is added to component (A) in order to promote a slow cure at room temperature so as to allow full flow of the liquid polyurethane to the edges of the substrate before setting.

Also see U.S. Pat. No. 6,045,864, which describes a coating system and method that allows coatings, such as polyurethane coatings, to be formed from a variety of coatable compositions that are entirely free of or have relatively little solvent. A fluid composition described therein is atomized and contacted with a carrier gas to vaporize substantially all of the atomized fluid composition, which condenses onto a surface to form a coating. However, such coatings are said to be capable of formation to thicknesses ranging only from 0.01 micrometer to 5 micrometers in a single pass, requiring multiple depositions or passes for formation of thicker films or multilayer sheets.

Due to the limitations of coating technology, many coating layers so formed are used in combination with one or more other layers in various articles. For example, see U.S. Pat. No. 7,160,973, which describes preparation of urethane polymers. The polymers are said to be useful as coating compositions that can be applied on an article/substrate by techniques that include spray coating, dip coating, roll coating, curtain coating, and the like. The coating compositions are also stated to be useful as a high-gloss coating and/or as the clearcoat of a composite color-plus-clear coating.

In contrast to coatings, a film may be used apart from an underlying substrate on which it is typically formed. Further, films are capable of imparting desired properties to their intended application without the need for coating multiple layers or laminating multiple films together.

Polymeric films are widely used in many applications. Whether a polymeric film is suitable for an intended application depends upon, for example, its physical properties such as strength, elasticity, clarity, color, durability, and the like. To be desirable for use in an application, however, preparation and application of the polymeric film must be cost-effective.

In addition to minimization of cost, optimization of a film for an intended application poses other challenges. In regards to optical applications, the amount of gelation occurring during formation of the film has been found to impact its optical qualities. A "gel" is generally understood to be a viscous composition, which in polymer processing can be, for example, an at least partially polymerized composition, one having a relatively high molecular weight, and/or one containing significant amounts of entrapped gas (e.g., air or reaction by-products, such as carbon dioxide). Gelation can make formation of uniform layers of polymeric material (e.g., films) difficult. Hence, optical quality of a film formed in the presence of significant gelation is often compromised.

Although "non-yellowing" films advertised as having "low gel" content are known (e.g., ARGOTEC 49510, a polycaprolactone based, aliphatic polyurethane film available from Argotec, Inc. of Greenfield, Mass.), preparation of such films is difficult. For example, a contributing cause to deterioration in a film's optical quality is gelation associated with entrapment of gases. Entrapment of gas, such as carbon dioxide produced when conventionally processing polyurethane films, is often encountered when polymerizing materials. The entrapped gas creates imperfections in the material, which can appear as visible imperfections impairing the optical qualities of the material. In optical applications, imperfections having a size of about 10 microns or greater are generally objectionable. Imperfections having a size of as small as about 5 microns are even often viewed as problematic.

Gelation also complicates the common hot-melt processing of polymeric materials. For example, when processing a conventional hot-melt processable composition into a film format, polymerization of the composition causes gelation that can result in processing inefficiencies in that, e.g., dispensing nozzle or extrusion, equipment used therewith can become clogged due to the continuously increasing or non-uniformly increasing viscosity of the polymerizing composition during hot-melt processing thereof.

In addition to the disadvantages associated with gelation in conventional processing of polymeric materials, many conventional processing techniques lack the overall processing efficiency desired. For example, a further disadvantage of conventional hot-melt processing techniques relates to the fact that hot-melt processing generally involves multiple processing steps. For example, in many applications, some method of increasing the cohesive strength of applied hot-melt compositions is often required (e.g., post-crosslinking or moisture-curing). Further, e-beam, which is often used to increase cohesive strength of applied hot-melt compositions, is not always desirable because it is expensive and can damage adjacent materials. Still further, UV-radiation, another common source for increasing cohesive strength of applied hot-melt compositions, is often not able to be used effectively for crosslinking relatively thick materials or materials containing certain fillers or pigments due to the need for such radiation to penetrate throughout the entire thickness of the material. In addition, some polymer chemistries are not capable are being hot-melt processed due to their relatively high molecular weight and/or the presence of crosslinking, both of which can make it difficult, if not impossible, to hot-melt process preformed pellets of the compositions (as is done generally according to conventional methods of forming polymer films using hot-melt processing) at a temperature below the degradation temperature of the polymer composition or substrate onto which the film is formed. Thus, the properties of conventionally manufactured polymer films are limited to those particular polymer chemistries that can be formed into films using conventional methodology.

Alternative methods to hot-melt processing also have their disadvantages, including not only the need to often perform additional processing steps to increase the cohesive strength of the material after film formation, but other disadvantages as well. In addition to essentially 100% solid hot-melt systems, it is known to produce polymers in both solventborne (i.e., those using mostly organic solvents as a solvating medium) and waterborne (i.e., those using mostly water as a dispersing medium) systems. These systems are applied to a substrate in the form of a solution or dispersion, respectively. Whether the system is solventborne or waterborne, however, it must first be coated onto a desired substrate and then dried to remove solvating or dispersing medium (i.e., organic solvent or water, respectively) in order to form a polymer film. Thus, processing efficiency is compromised by these additional processing steps, much as processing efficiency is compromised by the need to otherwise cure a composition after coating it onto a substrate using hot-melt processing or otherwise. In addition, formation of polymer films of sufficient thickness can be problematic using these alternative methods. Further, organic solvent-based polymerization methods present environmental concerns and are typically costly to utilize. In addition, some polymer chemistries are not capable of being formed into polymer films using solventborne methods due to the lack of adequate solubility of such polymers or their constituents in conventional solvents.

Still further, while continuous methods of polymerization on a web are known (i.e., conventional methods of on-web polymerization of (meth)acrylate adhesives), those methods typically require additional processing steps as well. For example, processing steps associated with pre-polymerizing conventional compositions to increase their viscosity such that the compositions are coatable onto the web are generally required when using such methods. If such pre-polymerization is not performed, the generally low molecular weight monomers used in preparation of such adhesive films typically flow uncontrollably off the web onto which they are coated before being polymerized. When performing such pre-polymerization, however, process efficiency is compromised as such pre-polymerization generally requires the use of an expensive chemical reactor or obtainment of specialized components that are pre-polymerized. Thus, alternative processing methods are desirable to improve overall efficiency when processing polymeric materials.

It is known to use a variety of processes for formation of articles having polymer (e.g., polyurethane-based) layers and systems utilizing a variety of chemistries in order to improve overall performance properties of the polymer system. In addition to the variety of conventional processing techniques for formation of conventional polymer films and articles, a wide variety of polymer chemistries are known. Polymer chemistry is often selected according to the intended end-use application.

Polyurethane-based chemistries are well known and used in many different types of applications. For example, polyurethane-based chemistries are known for their ability to provide superior optical and other performance properties. Despite the widespread use of polyurethane-based chemistry, obtainment of both maximized optical performance and processing efficiency is often not possible when using traditional methods for processing polyurethane-based films.

Thus, polyvinyl chloride is often used as a less expensive substitute for polyurethane-based chemistries, particularly in cost-sensitive applications (as the cost of polyvinyl chloride films is often about 10% to about 35% of the cost of a comparable polyurethane film). However, polyvinyl chloride is less desirable than polyurethane-based chemistries because of, for example, problems associated with plasticizer migration inherent when using polyvinyl chloride (that is of sufficient flexibility for many applications) and the controversial use of vinyl chloride monomers. Commonly used polyvinyl chloride plasticizers (e.g., phthalates) have been shown to negatively affect certain hormonal functions such as a body's endocrine system. Further, vinyl chloride monomers have been recognized as a carcinogen since the early 1970s. Still further, when polyvinyl chloride is burned, it often creates hazardous, halogen-based air pollutants such as hydrogen chloride. As such, many environmental and public safety organizations strongly oppose the manufacture of polyvinyl chloride, especially plasticized polyvinyl chloride, many governments are considering legislating or banning the use of polyvinyl chloride, and many companies are phasing out the use of polyvinyl chloride in their products.

Not surprisingly, alternatives to conventional polyvinyl chloride, such as increased use of polyurethane chemistry, are desirable and of interest. For example, U.S. Pat. No. 5,428,087 describes preparation of a modified polyvinyl chloride composition using blocked isocyanate and polyol and/or polyamine components that react upon heating to form a polyurethane or polyurea polymer network in-situ within the gelling polyvinyl chloride composition. The isocyanate component is said to contain isocyanate groups that must be blocked to enable the composition to be produced as a single component final product at a first location and then transported to a second location for actual article-forming use many days later without fear of premature gelation/network formation. The addition of the polyurethane or polyurea network is said to increase the resistance of the polyvinyl chloride to heat and solvents and reduce the occurrence of plasticizer migration therein.

Similarly, U.S. Pat. No. 7,157,527 describes preparation of interpenetrating polymer networks using blocked polyurethane/polyurea prepolymers. The polymer networks formed are based on a polyurethane or polyurea prepolymer in combination with a polymeric component including an acrylate resin or epoxy resin. The networks so formed are said to be useful as layers in golf balls.

U.S. Pat. No. 7,138,466 describes a polyurethane hot-melt adhesive composition. The adhesive composition is prepared using a moisture curable reactive hot-melt process. The compositions therein are said to have improved green strength and be useful for bonding a number of articles.

U.S. Pat. No. 4,292,827 describes a method for making decorative emblems, plaques, or panels comprising flow coating a clear, fluent plastic material onto the surface of a decorated substrate. Flow coating is accomplished with a multiple orifice nozzle(s) that is passed over the surface of the decorative substrate at a steady speed to give a uniform coating thickness of 0.020 inch to 0.030 inch. The flow-coated plastic is then cured and the coated, decorative substrate is stamped to form slightly convex emblems, plaques, or panels. Similarly, U.S. Pat. No. 4,332,074 describes formation of an integral bezel around the periphery of such a decorative surface.

While polyurethane-based chemistry is used to form a number of useful polymer films and articles, the use of such chemistry has not been successfully expanded to enable efficient formation of films. Thus, alternative methods for formation of polymer films, particularly polyurethane films, are desired. It would also be advantageous to provide polymerizable compositions that are polymerizable to films using improved methods, including continuous methods. Further, there is a recognized need to improve not only processing efficiency, but also optical properties of polymer films so formed.

BRIEF SUMMARY OF THE INVENTION

Advantageously, the present invention provides for formation of polymer films using improved methods. In preferred embodiments, methods of the invention comprise continuous methods.

Generally, a method for formation of a polymer film in-situ according to the invention comprises steps of: providing a polymerizable composition in one or multiple parts; initiating polymerization of the polymerizable composition to form a polymerizing composition; prior to completion of polymerization of the polymerizable composition, forming a film therefrom; and fully polymerizing the polymerizing composition to form the polymer film. In a further embodiment, the polymerizable composition comprises at least one blocked component and the method further comprises the step of unblocking the blocked component subsequent to forming the film in order to facilitate bonding between the polymer film and an adjacent surface.

According to methods of the invention, polymer films are formed in-situ. In one embodiment, the polymerizable composition is positioned in a desired film shape on a supporting substrate. Further processing steps to shape the polymer into a film of desired dimensions are not required. After its formation, the polymer film is capable of being physically separated from the supporting substrate on which the polymer film is formed.

In one embodiment, the polymerizable composition is essentially non-polymerized prior to initiating polymerization of the polymerizable composition. Among other variations, polymerization can be initiated according to the invention without use of external energy sources.

In one exemplary embodiment, the polymerizable composition has a dynamic viscosity of less than about 5 kiloPascal-seconds (500,000 centiPoise) during formation of a film therefrom. The polymerizable composition has a dynamic viscosity of less than about 4 Pascal-seconds (4,000 centiPoise) during formation of a film therefrom in another exemplary embodiment. According to another aspect of the invention, the polymerizable composition has a dynamic viscosity of more than about 2 Pascal-seconds (2,000 centiPoise) during formation of a film therefrom.

In one embodiment, a polymer film is formed prior to completion of polymerization of the polymerizable composition at processing temperatures less than about 200° C. In another embodiment, a polymer film is formed prior to completion of polymerization of the polymerizable composition at processing temperatures less than about 90° C. According to another embodiment, a polymer film is formed prior to completion of polymerization of the polymerizable composition at processing temperatures of less than about 70° C.

According to a preferred aspect of methods of the invention, the polymerizable composition is essentially free of solvents. As such, it is preferred that the polymer film is essentially free of unreacted solvent.

A variety of polymer films can be formed according to methods of the invention. In an exemplary embodiment, the polymer film is a performance film, such as a polymer film having an outdoor durability of at least about two years.

In a preferred embodiment, methods of the invention were found to be particularly beneficial for formation of polyurethane-based films. Polyurethane-based films according to the invention can be advantageously used in, for example, optical applications. According to one embodiment, the polymer film formed is essentially free of visual imperfections having a size of about 10 microns or greater. According to another embodiment, the polymer film formed is essentially free of visual imperfections having a size of about 5 microns or greater. According to yet further embodiments, the polymer film formed is essentially free of visual imperfections having a size of about 1 micron or greater.

Any suitable processing equipment can be used in methods of the invention. According to an exemplary embodiment of the invention, components of the polymerizable composition are added to a metering pump and promptly pumped into a slot die when polymerization is initiated. According to one embodiment, a polymer film is formed using coating equipment comprising a precision-ground surface contacting the polymerizing composition. According to yet another embodiment, a polymer film is formed using coating equipment comprising a low surface energy composition contacting the polymerizing composition.

BRIEF DESCRIPTION OF THE DRAWINGS

Note that the components and features illustrated in all figures throughout this application are not necessarily drawn to scale and are understood to be variable in relative size and placement. Similarly, orientation of the components and features within the figures can vary such that, for example, a horizontal configuration could be readily reoriented to a vertical configuration, and vice versa, as desired.

DETAILED DESCRIPTION OF THE INVENTION

Figure 1A:
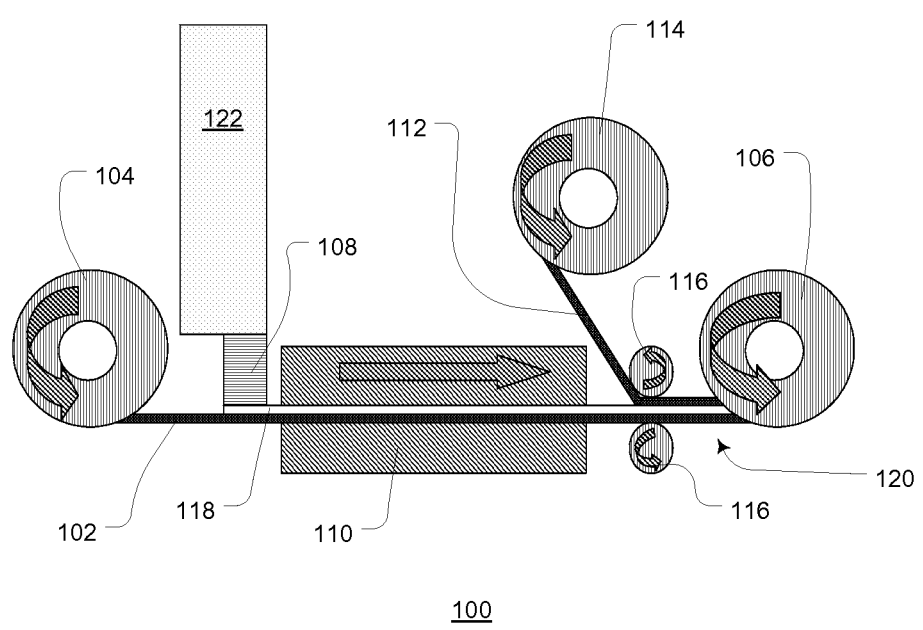
FIG. 1A is a schematic representation of an exemplary method and associated processing equipment useful for formation of polymer films according to the invention.

"Polymer films" of the invention are relatively thin, continuous, single layers of polymeric material. In exemplary embodiments, polymer films are able to be physically separated from the supporting substrate on which they are formed so that they can be used as a stand-alone layer or as one of multiple layers in another application. Recognize, however, that polymer films may be formed contiguously with or subsequently laminated to other polymer films or layers (e.g., adhesive layers) according to further embodiments of methods of the invention.

Methods of the invention are useful for forming a wide variety of polymer films based on a variety of chemistries. Application of these methods finds particular use in formation of polymer films having, for example, improved performance and/or optical properties. In addition, preferred embodiments of the invention include methods of preparation of such polymer films without use of solvents (i.e., using 100% solids chemistry). As compared to many conventional technologies, preferred methods of the invention and polymer films prepared therefrom are environmentally friendly, cost-effective, plasticizer-free (e.g., phthalate plasticizer-free), and/or halogen-free (e.g., as compared to polyvinyl chloride). In exemplary embodiments, process efficiencies imparted by methods of the present invention facilitate a reduction in polymer processing cost, enabling production of polymer films that are not only a superior, but also a cost-effective, replacement for polyvinyl chloride films.

According to one aspect of the invention, polymer films prepared according to methods of the invention have advantageous performance properties. Performance properties obtainable in exemplary polymer films prepared according to methods of the invention include, for example, a gloss value of about 14 to about 20 when measured using a 60-degree gloss meter according to test methods known to those of ordinary skill in the art (e.g., ASTM D2457-03, ASTM D523, variations thereof, and similar methods).

Yet other performance properties obtainable in polymer films prepared according to methods of the invention include, for example, a defects gray scale value of at least 4 (i.e., indicating no defects or only slight, but unremarkable, defects) after heat aging for 168 hours at 80° C. when measured according to test methods known to those of ordinary skill in the art (e.g., ASTM D2616-96, variations thereof, and similar methods).

Still other performance properties obtainable in polymer films prepared according to methods of the invention include, for example, a defects gray scale value of at least 4 (i.e., indicating no defects or only slight, but unremarkable, defects) after ten cycles of exposure to leaded or unleaded gasoline for 10 seconds followed by 20 seconds of non-exposure when measured according to test methods known to those of ordinary skill in the art (e.g., ASTM D2616-96, variations thereof, and similar methods).

In one embodiment, polymer films prepared according to methods of the invention meet one or more of the performance requirements for one or more of the film types set forth in GM Engineering Standard GM6074M ("Decorative Exterior Decals") published by General Motors Corporation and incorporated herein by reference in its entirety, when applied to a surface as specified therein. Such polymer films are understood to be "performance films," as the phrase is used herein. Preferably, such performance films meet a majority of the performance requirements for one or more of the film types set forth in GM Engineering Standard GM6074M ("Decorative Exterior Decals"). Most preferably, such polymer films meet essentially all of the performance requirements for one or more of the film types set forth in GM Engineering Standard GM6074M ("Decorative Exterior Decals").

Performance films according to the invention are capable of exhibiting superior outdoor durability. Exemplary performance films of the invention exhibit an outdoor durability of about two years or more, preferably about five years or more, and more preferably about ten years or more. A performance film is understood to be durable if it exhibits a defects gray scale value of at least 4 (i.e., indicating no defects or only slight, but unremarkable, defects) after repeated exposure to an outdoor environment. Outdoor durability can be measured in a simulated environment according to methods known to those of ordinary skill in the art. For example, the following test methods can be used: SAEJ2020 (QUV-B for 1,000 hours using 313 nanometer UV lamps), SAEJ1960 (Xenon for 2,000 hours), Simulated Florida PV 3930 (Xenon for 1,600 hours), and Simulated Arizona PV 3929 (Xenon for 1,500 hours). A performance film is also understood to be durable in the presence of water and humidity if it exhibit a defects gray scale value of at least 4 (i.e., indicating no defects or only slight, but unremarkable, defects) after being immersed in 40° C. water for 168 hours when measured according to test methods known to those of ordinary skill in the art (e.g., ASTM D2616-96, variations thereof, and similar methods). Certain conventional polymer films, such as calendared polyvinyl chloride, are known to exhibit outdoor durability of about two years; however, further performance films are preparable according to the novel methods of the invention.

According to another aspect of the invention, polymer films prepared according to methods of the invention are capable of having improved optical properties as compared to films of the same chemistry prepared using other methods. Optical properties of a polymer film can be evaluated using methods and equipment known to those of ordinary skill in the art. For example, cross-polarized light can be used to optically evaluate polymer films as described by Earl T. Hackett, Jr. in "Film Inspection Using Cross-Polarized Light—The Old Method Can Give New Life to Film Inspection Procedures," *Pharmaceutical & Medical Packaging News*, July 2004. Polymer films can also be optically evaluated using methodology and equipment incorporated in ISRA VISION SYSTEMS, such as the SMASH Advanced Surface Inspection System (available from ISRA Surface Vision, Inc. of Norcross, Ga.).

According to an exemplary embodiment, polymer films of the invention are essentially free of visual imperfections having a size of about 10 microns or greater. According to a further exemplary embodiment, polymer films of the invention are essentially free of visual imperfections having a size of about 5 microns or greater. According to yet another exemplary embodiment, polymer films of the invention are essentially free of visual imperfections having a size of about 1 micron or greater. Such polymer films are obtainable using the methods and components described herein.

According to one aspect of the invention, a polymer film is formed from a polymerizable composition of the invention. While polymer films of the invention can be any suitable and desired thickness, polymer films of the invention preferably having a thickness of less than about 0.24 inch (6 mm) and more preferably less than about 0.039 inch (1 mm). It is to be understood, however, that thicker and thinner polymer films can also be formed according to the invention. For example, polymer films as thin as 0.010 inch (0.25 mm), 0.0010 inch (0.025 mm), and even 0.0001 inch (0.0025 mm), can be formed in exemplary embodiments. In any event, it is preferred that the polymer film has a sufficient thickness to maintain its integrity as a continuous polymer layer.

According to improved methods of the invention, polymer films are formed in-situ. In many embodiments, further processing steps to shape the polymer into a film of desired dimensions are not required. It is to be understood that, as used herein, when a polymerizable composition of the invention is polymerized into a desired polymer film "in-situ," polymerization of the polymer comprising the film begins just before, while, or shortly after the polymerizable composition is being positioned into the desired film format and polymerization is essentially completed during such positioning or shortly thereafter.

Polymerizable Compositions

By use of the term "polymerizable," it is to be understood that such a composition contains components that will polymerize upon initiation. The polymerizable composition may exist in one or multiple parts, depending on the nature of the components therein. It is also to be understood that each part of the polymerizable composition may itself comprise more than one premixed components.

"Polymerizable compositions" of the invention include at least two different components (e.g., monomers, which can be mono-, di-, tri-functional, etc.), wherein the two components are mutually reactive with each other via chemically different reactive moieties to form a polymeric backbone. The two components may react to form the polymeric backbone in linear, branched, and/or networked polymers. In preferred embodiments, polymerizable compositions are polymerizable using step-growth or similar polymerization methods. For example, polyurethanes, polyureas, and polyamides are capable of being formed according to the invention using such polymerization methods.

In an exemplary embodiment, each of the at least two different components forming the polymerizable composition has an average molecular weight that is less than about 10% of the weight average molecular weight of the fully polymerized composition. In another exemplary embodiment, each of the at least two different components forming the polymerizable composition has an average molecular weight that is less than about 10% of the weight average molecular weight of the fully polymerized composition. In yet another exemplary embodiment, each of the at least two different components forming the polymerizable composition has an average molecular weight that is less than about 50% of the weight average molecular weight of the fully polymerized composition.

The maximum viscosity capable of facilitating positioning of the composition onto the underlying substrate can vary and depends on many factors, such as e.g., methodology, chemistry of the composition, processing temperature, and desired properties (e.g., thickness) of the resulting polymer film. In one exemplary embodiment, the polymerizable or polymerizing composition has a dynamic viscosity, measured using a Brookfield Viscometer as known to those of ordinary skill in the art, of less than about 5 kiloPascal-seconds (500,000 centiPoise) during formation of a film therefrom. In another exemplary embodiment, it is preferred that the polymerizable or polymerizing composition has a dynamic viscosity of less than about 4 Pascal-seconds (4,000 centiPoise) during its positioning into the desired film format. The polymerizing or polymerizing composition is positionable at such a viscosity without requiring that it be heated to significantly elevated temperatures.

Preferably, the polymerizable or polymerizing composition is positionable into the desired film format at processing temperatures less than about 90° C., more preferably at temperatures of about 70° C. to about 90° C., and most preferably at temperatures of less than about 70° C. The use of such relatively low processing temperatures is generally advantageous and preferred so as not to compromise processing efficiency or cause the polymerization reaction to occur too rapidly, which can potentially clog processing equipment utilized or cause imperfections in the polymer film so formed. In many embodiments, a polymer film is formed prior to completion of polymerization of the polymerizable composition at processing temperatures of up to about 200° C. In yet other embodiments, a polymer film is formed prior to completion of polymerization of the polymerizable composition at processing temperatures of up to about 150° C.

Maintaining sufficient flowability, as evidenced by a workable viscosity, is counter-balanced by the need to maintain a minimum viscosity such that the polymerizable or polymerizing composition is flowable onto a substrate in a controlled manner. If flow is uncontrollable, the polymerizable or polymerizing composition is often not capable of efficiently forming a polymer film without undesirably running off the substrate onto which it is coated. Thus, it is preferred that the polymerizable or polymerizing composition has a dynamic viscosity, measured using a Brookfield Viscometer as known to those of ordinary skill in the art, of more than about 2 Pascal-seconds (2,000 centiPoise) during its positioning into the desired film format.

Preferably, the polymerizable or polymerizing composition is a viscous liquid at temperatures below about 200° C. In another preferred embodiment, the polymerizable or polymerizing composition is a viscous liquid at temperatures below about 150° C. In yet another preferred embodiment, the polymerizable or polymerizing composition is a viscous liquid at temperatures below about 90° C.

Understand that a polymerizable composition may be partially polymerized or essentially non-polymerized. In order to maximize processing efficiency processing, however, it is preferred that polymerizable compositions are essentially non-polymerized prior to initiating polymerization thereof according to methods of the invention. Thus, the use of specialized and costly components and/or additional processing steps and associated equipment is eliminated according to such preferred aspects of methods of the invention.

Components of exemplary polymerizable compositions and which are useful in the formation of polymer films according to methods of the invention are described further below with reference to certain terms understood by those in the chemical arts as referring to certain hydrocarbon groups. Reference is also made throughout the specification to polymeric versions thereof. In that case, the prefix "poly" is inserted in front of the name of the corresponding hydrocarbon group.

Except where otherwise noted, such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof).

The term "aliphatic group" means a saturated or unsaturated, linear, branched, or cyclic hydrocarbon group. This term is used to encompass alkylene (e.g., oxyalkylene), aralkylene, and cycloalkylene groups, for example.

The term "alkylene group" means a saturated, linear or branched, divalent hydrocarbon group. Particularly preferred alkylene groups are oxyalkylene groups.

The term "oxyalkylene group" means a saturated, linear or branched, divalent hydrocarbon group with a terminal oxygen atom.

The term "aralkylene group" means a saturated, linear or branched, divalent hydrocarbon group containing at least one aromatic group.

The term "cycloalkylene group" means a saturated, linear or branched, divalent hydrocarbon group containing at least one cyclic group.

The term "oxycycloalkylene group" means a saturated, linear or branched, divalent hydrocarbon group containing at least one cyclic group and a terminal oxygen atom.

The term "aromatic group" means a mononuclear aromatic hydrocarbon group or polynuclear aromatic hydrocarbon group. The term includes arylene groups.

The term "arylene group" means a divalent aromatic group.

Exemplary Polyurethane-Based Films

Exemplary polymer films prepared according to methods of the invention are polyurethane-based. For simplicity, the term "polyurethane" as used herein includes polymers containing urethane (also known as carbamate) linkages, urea linkages, or combinations thereof (i.e., in the case of poly(urethane-urea)s). Thus, polyurethane-based compositions contain at least urethane linkages, urea linkages, or combinations thereof. Furthermore, polyurethane-based polymers are based on polymers where the polymeric backbone has at least 80% urethane and/or urea repeat linkages formed during the polymerization process.

Polyurethane-based performance films prepared according to methods of the invention have many uses. For example, they can replace polyvinyl chloride used in many applications, such replacement being at a significantly lower cost than when polyurethane-based films prepared according to conventional methods are used. In addition, polyurethane-based films prepared according to the invention can replace the use of, for example, polyester films on hurricane glass due to the desirable optical properties of polyurethane-based films prepared according to exemplary methods of the invention. Polyurethane-based films prepared according to methods of the invention can also be economically used as optically clear paint protection film according to exemplary embodiments.

Polymer films comprising polyurethane-based polymers are prepared according to methods of the invention by reacting components, which include at least one isocyanate-reactive (e.g., hydroxy-functional, such as polyol) component and at least one isocyanate-functional (e.g., polyisocyanate) component.

Isocyanate-Reactive Component

Any suitable isocyanate-reactive component or combinations thereof can be used according to the present invention. The "isocyanate-reactive component" contains at least one isocyanate-reactive material. As understood by those of ordinary skill in the art, an isocyanate-reactive material includes at least one active hydrogen. Those of ordinary skill in the polyurethane-based chemistry art will understand that a wide variety of materials are suitable for use as this component. For example, amines, thiols, and polyols are known isocyanate-reactive materials.

It is preferred that the isocyanate-reactive material is a hydroxy-functional material. Polyols are a preferred hydroxy-functional material used in the present invention. Polyols provide urethane linkages when reacted with an isocyanate-functional component, such as a polyisocyanate.

Polyols of the invention can be of any molecular weight, including relatively low molecular weight polyols (i.e., having a weight average molecular weight of less than about 250) commonly referred to as "chain extenders" or "chain extending agents," as well as those polyols having higher molecular weights. In one preferred embodiment, the polyols used according to the invention are selected to have a molecular weight such that their room temperature viscosity is minimized.

As noted above, more than one isocyanate-reactive material can be used according to the invention. For example, a mixture of polyols is used for the isocyanate-reactive material according to one embodiment. Preferably, such a mixture contains polyols that are essentially miscible in one another when heated, if such heating becomes necessary. In one embodiment, the mixture of polyols is miscible upon heating to a temperature of about 50° C. In another embodiment, the mixture of polyols is miscible upon heating to a temperature of about 60° C. An exemplary combination of polyols comprises approximately equal amounts of at least three polyols, each of the three polyols having a respective weight average molecular weight of about 1,000, about 2,000, and about 3,000. When used in exemplary methods of the invention, such a combination was found to provide a polymerizable composition providing a polymerizing composition having adequate coatability and a resulting polymer having desirable properties (e.g., optimized elasticity).

Polyols, as opposed to monols, have at least two hydroxy-functional groups. According to one embodiment, polyols of the invention generally comprise diols. Diols contribute to formation of relatively high molecular weight polymers without requiring crosslinking, such as is conventionally introduced by using polyols having greater than two hydroxy-functional groups, to provide a polymer having a desired cohesive strength.

Examples of polyols useful in the present invention include, but are not limited to, polyalkylene polyols (e.g., 1,4-butane diol); polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof; polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof); mixtures thereof; and copolymers therefrom.

Suitable polyether polyols are available from BayerMaterialScience LLC of Pittsburgh, Pa. in the series sold under the ARCOL trade designation. Examples include those sold under the ARCOL PPG-1000, ARCOL PPG-2000, ARCOL PPG-3025, and ARCOL PPG-4000 trade designations. These polyether polyols generally have fluid-like properties at room temperature.

Polyester polyols, such as caprolactone polyols, are preferred. Such polyester polyols are commercially available, including several from suppliers such as Solvay Caprolactones of the United Kingdom (now sold by the Perstorp Group in Sweden) under the CAPA trade designation. Exemplary polyester polyols from Solvay Caprolactones (now sold by Perstorp) are sold under the trade designations, CAPA 2043, CAPA 2047A, CAPA 2100A, CAPA 2101A, CAPA 2200A, CAPA 2302A, CAPA 2403D, CAPA 3022, CAPA 3091, CAPA 3201, CAPA 6500, and CAPA 6800. Particularly preferred for many applications are those sold under the trade designations, CAPA 2047A, CAPA 2101A, CAPA 2200A, CAPA 2302A, or polyester polyols having similar molecular weights and/or properties such as hydrolytic resistance.

Many of the afore-mentioned polyester polyols have solid-like properties at room temperature, so it is often preferred to pre-heat such polyols before combining them with other components in the polymerizable compositions of the invention. The amount and duration of preheating is generally at least the minimum necessary to transform the polyols from solids to those having fluid-like properties. While further heating is generally unnecessary to achieve desired results, it can be performed to increase the speed of polymerization and influence the end properties of the polymer film itself. However, it is to be understood that additional heating may decrease the overall process efficiency and lead to undesirable clogging of processing equipment as described throughout.

When copolymer polyols are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer. One preferred example of a copolymer containing oxyalkylene repeating units is a polyoxyalkylene-capped polyoxyalkylene polyol (e.g., a polyoxyethylene-capped polyoxypropylene).

Certain applications, including those where preparation of a polymer film having improved optical qualities is desired, will benefit from using components that polymerize to polymers having fewer residuals (i.e., reactive components, such as monomers, that remain unreacted in the reaction product) than the number of residuals in conventional polymers having a similar chemistry. Such applications include, for example, electronics applications and medical applications. The presence of residuals in materials used in these applications can be problematic. For example, the presence of residuals in materials used for electronics applications can contaminate other components in the electronic component. The presence of residuals in materials used for medical applications can cause irritation, sensitization, or skin trauma if the residuals migrate from within the material to a surface in contact with skin, for example. It is also foreseeable that materials having fewer residuals will be advantageous for use in applications having contact with, for example, food or other products intended for animal (e.g., human) consumption.

In an exemplary embodiment, when higher molecular weight polyols (i.e., polyols having weight average molecular weights of at least about 2,000) are used, it is preferred that such polyol components be "highly pure" (i.e., the polyol approaches its theoretical functionality—e.g., 2.0 for diols, 3.0 for triols, etc.). These highly pure polyols preferably have a ratio of polyol molecular weight to weight % monol of at least about 800, preferably at least about 1,000, and more preferably at least about 1,500. For example, a 12,000 weight average molecular weight polyol with 8 weight % monol has a ratio of 1,500 (i.e., 12,000/8=1,500). Preferably, the highly pure polyol contains about 8% by weight monol or less.

Generally, as the molecular weight of the polyol increases in this exemplary embodiment, a higher proportion of monol may be present in the polyol. For example, polyols having weight average molecular weights of about 3,000 or less preferably contain less than about 10% by weight of monols. Polyols having weight average molecular weights of greater than about 3,000 to about 4,000 preferably contain less than about 3% by weight of monols. Polyols having weight average molecular weights of greater than about 4,000 to about 8,000 preferably contain less than about 6% by weight of monols. Polyols having weight average molecular weights of greater than about 8,000 to about 12,000 preferably contain less than about 8% by weight of monols.

Other benefits derived from using highly pure polyols include the ability to form polymer films comprising relatively high molecular weight polymers without inherent crosslinking, such as is conventionally introduced into polymers by polyols having greater than two hydroxy-functional groups. For example, when conventional diols (e.g., those diols having greater than about 10% by weight or greater of monols) are used to prepare polyurethane-based polymer films, higher functional polyols (e.g., triols) are also typically used in an attempt to balance the stoichiometric ratio of isocyanate-reactive (e.g., hydroxy-functional) groups to isocyanate-functional groups in the reaction mixture. It is the higher-functional polyols (i.e., those having more than two hydroxy-functional groups) that predominantly contribute to crosslinking of the polymer.

In general, preferred diols useful in methods of the invention are represented by Formula I:

$$\text{HO}-\text{R}-\text{OH} \qquad (I)$$

wherein R represents an aliphatic group, aromatic group, mixtures thereof, polymers thereof, or copolymers thereof. Preferably R is a polyalkylene group, polyoxyalkylene group, polyester group, or mixtures thereof.

It is to be understood, however, that although polyols containing more than two hydroxy-functional groups are generally less preferred than diols, certain higher functional polyols may also be used in the present invention. These higher functional polyols may be used alone, or in combination with other isocyanate-reactive materials, for the isocyanate-reactive component.

In one aspect of this embodiment, these higher functional polyols are converted to diols prior to their use in the isocyanate-reactive component. After such conversion, the reaction products are considered diols according to the present invention. For example, one preferred class of higher functional polyols that can be used in the present invention includes polyoxyalkylene triols, which can be reacted with a carboxylic acid cyclic anhydride or a sulfocarboxylic acid cyclic anhydride to reduce the functionality thereof. The polyoxyalkylene triol is preferably polyoxypropylene or, more preferably, a polyoxypropylene polyoxyethylene copolymer. The cyclic carboxylic anhydride is preferably selected from anhydrides such as succinic; glutaric; cyclohexanedicarboxylic; methylsuccinic; hexahydro-4-methylphthalic; phthalic; 1,2,4-benzenetricarboxylic; maleic; fumaric; itaconic; 3,4,5,6-tetrahydrophthalic; and 1-dodecen-1-yl succinic; cis-aconitic anhydrides and mixtures thereof. The sulfocarboxylic cyclic anhydride is preferably 2-sulfobenzoic acid cyclic anhydride.

When the triol molecular weight used to prepare such reaction products is relatively low (i.e., having a weight average molecular weight of less than about 3,000), the ester-acid reaction products are preferably used in combination with another isocyanate-reactive material. When the triols have a molecular weight of about 3,000 or greater, preferably about 4,500 or greater, the ester-acid reaction product is generally suitable for use without other isocyanate-reactive materials according to a preferred embodiment of methods of the invention.

As noted above, for broader formulation latitude, at least two isocyanate-reactive materials, such as polyols, may be used for the isocyanate-reactive component. The use of a mixture of materials for the isocyanate-reactive component also allows for improved cost-effectiveness, where desired. For example, more expensive isocyanate-reactive materials may be mixed with less expensive isocyanate-reactive materials for the isocyanate-reactive component. This may be the case, for example, when highly pure relatively high molecular weight polyols are mixed with relatively high molecular weight polyols that are less pure or with lower molecular weight polyols.

Preferably, when used, the mixture of isocyanate-reactive materials for the isocyanate-reactive component includes at least two diols. Most preferably, all polyols in the mixture are diols. As stated above, diols are preferred over other polyols due to their tendency to contribute to higher molecular weight polymers without inherent crosslinking. Thus, if present, it is preferred that polyols other than diols comprise less than about 10% by weight, more preferably less than about 5% by weight, of the polyol component.

When using a combination of a relatively low weight average molecular weight polyol and a relatively high weight average molecular weight polyol, it is preferred that the weight average molecular weights of the two polyols differ by at least about 500 or, more preferably, by at least about 1,000. For purposes of this invention, relatively low weight average molecular weight polyols are those having a weight average molecular weight of less than 2,000. Similarly, relatively high weight average molecular weight polyols are those having a weight average molecular weight of 2,000 or more.

In order to defer polymerization of the polymerizable composition until desired or defer reaction of the resulting polymer film with an adjacent surface according to certain embodiments of the invention (e.g., until just prior to, during, or after positioning of the polymerizable composition into a desired film format), the isocyanate-reactive component can be blocked in further embodiments of the invention. For example, the polymerizable composition may contain isocyanate-reactive components having functional groups that remain blocked (i.e., non-reactive) until a time subsequent to formation of the polymer film and at which time enhanced bonding between the polymer film and an adjacent surface may be desired (e.g., as in an epoxy/urethane lamination). While the discussion of blocked components herein is predominantly with respect to the exemplary embodiment comprising formation of a polyurethane-based film, it is to be understood that similar use of blocked components can be incorporated into methods of forming polymer films comprising other chemistries.

"Blocked" isocyanate-reactive components are those that contain an active group bonded to the isocyanate-reactive moieties thereof such that the isocyanate-reactive moieties or a portion thereof remain inert until activated by unblocking. Use of blocked components and methods for unblocking the same are incorporated into methods of the present invention using principles understood by those of ordinary skill in the art of using blocked components.

Any suitable active groups can be used to form blocked isocyanate-reactive components as understood by those of ordinary skill in the art. For example, as blocking agents it is possible in particular to use phenols (e.g., phenol, nonylphenol, cresol), linear and branched alcohols, oximes (e.g., butanone oxime, cyclohexanone oxime, methylethyl ketoxime), lactams (e.g., ε-caprolactam), lactones (e.g., caprolactones such as ε-caprolactone), secondary amines (e.g., diisopropyl-amine), pyrazoles (e.g., dimethylpyrazole), imidazoles, triazoles), β-dicarbonyl compounds, malonic and acetic esters, or combinations thereof. Commercially available blocked isocyanate-reactive components can also be used.

It is to be understood that, depending on their chemistry, isocyanate-reactive components can be unblocked using any suitable method. In an exemplary embodiment, an isocyanate-reactive component can be unblocked using heat and/or radiation (e.g., ultraviolet radiation).

Isocyanate-Functional Component

Any suitable isocyanate-functional component or combinations thereof can be used according to the present invention. The isocyanate-reactive component is reacted with at least one isocyanate-functional component during formation of polyurethane-based polymer films of the invention. The "isocyanate-functional component" contains one or more isocyanate-functional groups.

Polyisocyanates, including derivatives thereof (e.g., ureas, biurets, allophanates, dimers and trimers of polyisocyanates, and mixtures thereof), hereinafter collectively referred to as "polyisocyanates," are preferred for use as the isocyanate-functional component. Polyisocyanates have at least two isocyanate-functional groups and provide urethane linkages when reacted with the preferred hydroxy-functional isocyanate-reactive components.

Generally, diisocyanates are the preferred polyisocyanates. Particularly preferred diisocyanates useful in the present invention are generally represented by Formula II:

$$OCN-Z-NCO \qquad (II)$$

wherein Z represents any suitable polyvalent radical, which may be, for example, polymeric or oligomeric. For example, Z can be based on arylene (e.g., phenylene), aralkylene, alkylene, cycloalkylene, polysiloxane (e.g., polydimethyl siloxane), or polyoxyalkylene (e.g., polyoxyethylene, polyoxypropylene, and polyoxytetramethylene) segments and mixtures thereof. Preferably Z has about 1 to about 20 carbon atoms, more preferably about 6 to about 20 carbon atoms. For example, Z can be selected from 2,6-tolylene; 2,4-tolylene; 4,4'-methylenediphenylene; 3,3'-dimethoxy-4,4'-biphenylene; tetramethyl-m-xylylene; 4,4'-methylenedicyclohexylene; 3,5,5-trimethyl-3-methylenecyclohexylene; 1,6-hexamethylene; 1,4-cyclohexylene; 2,2,4-trimethylhexylene; or polymeric or oligomeric alkylene, aralkylene, or oxyalkylene radicals and mixtures thereof. When Z is a polymeric or oligomeric material it may include, for example, urethane linkages.

In general, any diisocyanate that can react with the isocyanate-reactive material can be used in the present invention. Examples of such diisocyanates include, but are not limited to, aromatic diisocyanates (e.g., 2,6-tolyene diisocyanate; 2,5-tolyene diisocyanate; 2,4-tolyene diisocyanate; m-phenylene diisocyanate; 5-chloro-2,4-tolyene diisocyanate; and 1-chloromethyl-2,4-diisocyanato benzene), aromatic-aliphatic diisocyanates (e.g., m-xylylene diisocyanate and tetramethyl-m-xylylene diisocyanate), aliphatic diisocyanates (e.g., 1,4-diisocyanatobutane; 1,6-diisocyanatohexane; 1,12-diisocyanatododecane; and 2-methyl-1,5-diisocyanatopentane), and cycloaliphatic diisocyanates (e.g., methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), and other compounds terminated by two isocyanate-functional groups (e.g., the diurethane of tolyene-2,4-diisocyanate-terminated polypropylene oxide polyol).

Particularly preferred diisocyanates include: 2,6-tolyene diisocyanate; 2,4-tolyene diisocyanate; tetramethyl-m-xylylene diisocyanate; methylenedicyclohexylene-4,4'-diisocyanate; 3-isocyanatomethyl-3,5,5-trimethylcyclohexyl isocyanate (isophorone diisocyanate); 1,6-diisocyanatohexane; 2,2,4-trimethylhexyl diisocyanate; cyclohexylene-1,4-diisocyanate; methylenedicyclohexylene-4,4'-diisocyanate; and mixtures thereof. More preferred are 2,6-tolyene diisocyanate; 2,4-tolyene diisocyanate; tetramethyl-m-xylylene diisocyanate; 3-isocyanatomethyl-3,5,5-trimethylcyclohexyl isocyanate (isophorone diisocyanate); methylenedicyclohexylene-4,4'-diisocyanate; and mixtures thereof. Commercially available diisocyanates include, for example, those aliphatic diisocyanates available under the trade designation DESMODUR W, DESMODUR N 3400, DESMODUR Z4470 SN/BA, and BAYTEC WE-180 from BayerMaterialScience LLC of Pittsburgh, Pa. and that available under the trade designation TMXDI from Cytec Industries, Inc. of West Paterson, N.J.

Although not as preferred as diisocyanates, other polyisocyanates may be used in combination with diisocyanates, for the polyisocyanate component. For example, triisocyanates may be used. Triisocyanates include, but are not limited to, polyfunctional isocyanates, such as those produced from biurets, isocyanurates, adducts, and the like.

In order to defer polymerization of the polymerizable composition until desired or defer reaction of the resulting polymer film with an adjacent surface according to certain embodiments of the invention (e.g., until just prior to, during, or after positioning of the polymerizable composition into a desired film format), the isocyanate-functional component can be blocked in further embodiments of the invention. For example, the polymerizable composition may contain isocyanate-functional components having functional groups that remain blocked (i.e., non-reactive) until a time subsequent to formation of the polymer film and at which time enhanced bonding between the polymer film and an adjacent surface may be desired (e.g., as in an epoxy/urethane lamination). Again, while the discussion of blocked components herein is predominantly with respect to the exemplary embodiment comprising formation of a polyurethane-based film, it is to be understood that similar use of blocked components can be incorporated into methods of forming polymer films comprising other chemistries.

"Blocked" isocyanate-functional components are those that contain an active group bonded to the isocyanate-functional moieties thereof such that the isocyanate-functional moieties or a portion thereof remain inert until activated by unblocking. Use of blocked components and methods for unblocking the same are incorporated into methods of the present invention using principles understood by those of ordinary skill in the art of using blocked components.

Any suitable active groups can be used to form blocked isocyanate-functional components as understood by those of ordinary skill in the art. For example, as blocking agents it is possible in particular to use phenols (e.g., phenol, nonylphenol, cresol), linear and branched alcohols, oximes (e.g., butanone oxime, cyclohexanone oxime, methylethyl ketoxime), lactams (e.g., ε-caprolactam), lactones (e.g., caprolactones such as ε-caprolactone), secondary amines (e.g., diisopropyl-amine), pyrazoles (e.g., dimethylpyrazole), imidazoles, triazoles), β-dicarbonyl compounds, malonic and acetic esters, acrylic or methacrylic acid esters, or combinations thereof.

Commercially available blocked isocyanate-reactive components can also be used. Blocked isocyanate-functional components are available and include, for example, a blocked aliphatic isocyanate based on isophorone diisocyanate available from BayerMaterialScience LLC of Pittsburgh, Pa. under the DESMODUR BL-4265 trade designation (which unblocks at temperatures of about 150° C.). Other blocked isocyanate-functional components include, for example, aliphatic blocked isocyanates available from Baxenden Chemicals Ltd. of the United Kingdom under the trade designations TRIXENE BI 7950 (which unblocks at temperatures of about 120° C.) and TRIXENE BI 7981 (which unblocks at temperatures of about 180° C.). Understand, however, that many commercially available blocked isocyanate-functional components contain solvent. When a solventless process is preferred, the solvent would need to be removed (e.g., preferably before mixing with other components) as understood by those of ordinary skill in the art.

Chain Extender

Any suitable chain extender can be used according to the present invention. Chain extenders are usually short-chained difunctional molecules that react with isocyanate moieties and form hard segments in polyurethane-based polymers. For example, the chain extender can comprise water (including ambient moisture), a polyamine, a relatively low molecular weight polyol (i.e., a polyol having a weight average molecular weight of less than about 250) and combinations thereof. Examples of chain extenders comprising polyols include ethylene glycol; diethylene glycol; dipropylene glycol; neopentyl glycol; 1,4-butanediol; 1,6-hexanediol; 1,4-cyclohexane dimethanol; bis(2-hydroxyethyl) hydroquinone; bis(2-hydroxyethyl) bisphenol A; 2-methyl 1,3-propanediol; and glycerol.

When the chain extender comprises a polyamine, any suitable compound having at least two amine functional groups can be used for the polyamine. For example, the compound can be a diamine, triamine, etc. Preferably, the polyamine is a diamine. Mixtures of polyamines may also be used for the chain extender.

Examples of polyamines useful in the present invention include, but are not limited to, polyoxyalkylene polyamines, alkylene polyamines, and polysiloxane polyamines.

The polyoxyalkylene polyamine may be, for example, a polyoxyethylene polyamine, polyoxypropylene polyamine, polyoxytetramethylene polyamine, or mixtures thereof. Polyoxyethylene polyamine may be especially useful when preparing polymeric films for medical applications where, for example, high vapor transfer mediums and/or water absorbency may be desirable.

Alkylene polyamines include, for example, ethylene diamine; diethylene triamine; triethylene tetramine; propylene diamine; butylene diamine; hexamethylene diamine; cyclohexylene diamine; piperazine; 2-methyl piperazine; phenylene diamine; tolylene diamine; xylylene diamine; tris(2-aminoethyl)amine; 3,3'-dinitrobenzidine; 4,4'-methylene bis(2-chloroaniline); 2,5-diethyl-2,4-toluene diamine; 4,4'-methylene bis(3-chloro-2,6-diethylaniline); 3,3'-dichloro-4,4'-biphenyl diamine; 2,6-diaminopyridine; propylene glycol bis(4,4'-aminobenzoate); 3,5-di(thiomethyl),2,4-toluene diamine; methylene bis(4,4'-aniline); ethyl, 1,2-di(2-amino,thiopenol); 1,2-diaminoethane; N,N'-dialkyl (methylene dianiline); N,N'-dialkyl(1,4-diaminobenzene); 2-methyl 1,5-pentanediamine; 1,3-diaminopentane; methylene bis(2,6-diethylaniline); 2-methyl, 1,3-propanediol; 2-methylpentamethylenediamine; 4,4'-diaminodiphenylmethane; menthane diamine; m-xylene diamine; isophorone diamine; and dipiperidyl propane.

In order to defer polymerization of the polymerizable composition until desired or defer reaction of the resulting polymer film with an adjacent surface according to certain embodiments of the invention (e.g., until just prior to, during, or after positioning of the polymerizable composition into a desired film format), the chain extender or a portion thereof can be blocked in further embodiments of the invention. For example, the polymerizable composition may contain a chain extender having functional groups that remain blocked (i.e., non-reactive) until a time subsequent to formation of the polymer film and at which time enhanced bonding between the polymer film and an adjacent surface may be desired (e.g., as in an epoxy/urethane lamination). Again, while the discussion of blocked components herein is predominantly with respect to the exemplary embodiment comprising formation of a polyurethane-based film, it is to be understood that similar use of blocked components can be incorporated into methods of forming polymer films comprising other chemistries.

"Blocked" chain extenders are those that contain an active group such that the active moieties or a portion thereof remain inert until activated by unblocking. Use of blocked components and methods for unblocking the same are incorporated into methods of the present invention using principles understood by those of ordinary skill in the art of using blocked components.

Any suitable active groups can be used to form blocked chain extenders as understood by those of ordinary skill in the art. Exemplary chemistries for blocked chain extenders include the following types: ketimines (e.g., aldehyde- or ketone-blocked amines), oxazolidines (e.g., aldehyde-blocked aminoalcohols), and complexed amine chain extenders (e.g., CAYTUR 21 and CAYTUR 31 chain extenders available from Uniroyal Corporation—Uniroyal Chemical of Middlebury, Conn.).

Catalyst

Although not necessary in all embodiments of methods of formation of polymer film according to the invention, any suitable catalyst can be used to facilitate polymerization of the at least one isocyanate-reactive and at least one isocyanate-functional components. Examples of useful catalysts include amine catalysts, tin-based catalysts, bismuth-based catalysts (e.g., bismuth 2-ethylhexanoate), titanium-based catalysts (e.g., titanium chelate), zirconium-based catalysts (e.g., zirconium chelate), zinc-based catalysts (e.g., zinc octoate), other organometallic catalysts, and combinations thereof. By way of example, metal salts, such as dibutyl tin(IV) dilaurate, tin(II) bis(2-ethylhexanoate), bismuth(III) tris(2-ethylhexanoate), zinc(II) bis(2-ethylhexanoate), and zinc chloride; and tertiary amines, such as 1,4-diazabicyclo[2.2.2]octane, triethylamine, and benzyldimethylamine, can be used as catalysts when forming polyurethane-based polymer films according to methods of the invention. Commercially available catalysts include those marketed under the DABCO BL-11, DABCO S-25, and DABCO T-12 trade designations from Air Products and Chemicals, Inc. of Allentown, Pa.

In one embodiment, dibutyl tin(IV) dilaurate is used as a catalyst. This type of catalyst is often able to catalyze the desired reaction at room temperature, avoiding the additional processing step of heating the composition to a temperature where the catalyst initiates the desired polymerization reaction (i.e., threshold temperature). In many applications, this type of catalyst is preferred when a catalyst is used.

According to another embodiment, a catalyst is selected such that it will not catalyze polymerization of the isocyanate-reactive and isocyanate-functional components until a threshold temperature is exceeded or another condition exists. For example, a threshold temperature can be at least 80° C., or even ranging from about 80° C. to about 120° C. These types of catalysts are sometimes referred to as "delayed-action catalysts" or "blocked catalysts."

In order to defer polymerization of the polymerizable composition until desired or defer reaction of the resulting polymer film with an adjacent surface according to certain embodiments of the invention (e.g., until just prior to, during, or after positioning of the polymerizable composition into a desired film format), the catalyst or a portion thereof can be blocked in further embodiments. For example, the polymerizable composition may contain a catalyst having functional groups that remain blocked (i.e., non-reactive) until a time subsequent to formation of the polymer film and at which time enhanced bonding between the polymer film and an adjacent surface may be desired (e.g., as in an epoxy/urethane lamination).

Use of blocked components and methods for unblocking the same are incorporated into methods of the present invention using principles understood by those of ordinary skill in the art of using blocked components.

Any suitable active groups can be used to form blocked catalysts as understood by those of ordinary skill in the art. Exemplary blocked catalysts include acid-blocked amine catalysts using blocking agents such as formic acid, 2-ethylhexanoic acid, and phenol. Certain tin catalysts, such as the dialkyltin dithiocarbamates, may be used when delayed action catalysis is desired. Delayed-action catalysts, such as dialkyltin dithiocarbamates, typically have a higher activation energy than the more common dialkyltin carboxylates. Similarly, certain solid catalysts and encapsulated catalysts can provide delayed action catalysis when desired. Other types of catalysts can be activated upon exposure to ultraviolet radiation or other known techniques.

Additives

Any suitable additives can be present in polymerizable compositions of the invention. In some embodiments, polymer films are formed according to methods of the invention without inclusion of any additives. If present, however, additives are selected as known to those skilled in the art based on the intended application.

If desired, additives necessary to crosslink the polymer film subsequent to its formation can be included in the composition comprising the polymer film. For example, polymer films according to the invention can be crosslinked to form non-urethane linkages (e.g., aziridine-based linkages) or urethane linkages (e.g., linkages based on reaction of blocked isocyanate, polyol, and chain extender or reaction of isocyanate-terminated polymer chains with urethane linkages in backbones of adjacent polymer chains).

However, crosslinking is not necessary in exemplary embodiments of the invention. According to an exemplary embodiment of the present invention, polymer films are capable of being formed from improved chemistries as compared to films prepared using conventional methodology, which are often limited in the chemistries with which they can be used. As such, polymer films of the invention are capable of providing enhanced properties (e.g., linear polymeric films of such high molecular weight are capable of being formed in accordance with the present invention such that cross linking is not required for them to outperform conventional crosslinked polymer films).

As post-processing needed to increase cohesive strength of many conventional polymer films is not necessary in preferred embodiments of the invention, limitations on additives negatively impacting such conventional post-processing do not similarly apply when preparing polymer films according to the present invention. For example, pigments and fillers are exemplary additives for incorporation into polymer films of the invention. Exemplary fillers include: calcium carbonate (e.g., that sold by Specialty Minerals Inc. of Bethlehem, Pa. under the trade designation Hi-Pflex 100), barium sulfate barytes (e.g., those sold by Zigma International of India), titania (e.g., as sold by Ticona of Florence, Ky.), silica (e.g., as sold by Alchemie Technology of London and Boston, Mass.), and talc (e.g., as sold by Zigma International of India). Those skilled in the art are readily able to determine the amount of such additives to use for the desired effect and incorporate the same into methods of the invention.

Preferably, in order to further maximize processing efficiency and facilitate obtainment of polymer films having improved properties, polymerizable compositions of the invention are essentially free of solvents (e.g., organic solvents and water) that must be removed after formation of the polymer film or that can cause undesired reaction by-products. For example, significant water content in the isocyanate-reactive component can react with the isocyanate-functional component, which undesirably creates carbon dioxide gas and urea that can become entrapped in the polymer film and contribute to visual imperfections therein. While certain components of the polymerizable compositions may function in a manner similar to traditional solvents, such components can be integrated into the resulting polymer film without detrimentally impacting desired properties thereof (e.g., optical qualities) according to preferred embodiments of methods of the invention.

Conventionally, solvents are used to reduce viscosity of a composition such that a composition is coatable during formation of a film therefrom, after which time additional steps are necessary to remove the solvent from the composition or polymer film formed. Thus, such conventional solvents do not become integrated into the resulting polymer film and are generally not preferred for use according to the present invention. According to methods of the present invention, if individual components are prepared or supplied in conventional solvent, it is preferred to remove essentially all of the solvent prior to polymerization of the compositions of which they are a part. Any suitable method as known to those of ordinary skill in the art can be used to remove solvent from a component. In an exemplary embodiment, such components are vacuum-dried according to methods known to those of ordinary skill in the art to remove undesired solvent.

Recognizing the beneficial properties of solvents, however, in an exemplary embodiment the polymerizable compositions include components that function as a traditional solvent in that they help impart desired coatability of the composition, but yet they react with and become incorporated into the polymer films formed according to methods of the invention. For example, acrylic-capped urethanes can be included in polymerizable compositions of the invention for this purpose.

In general, the isocyanate-reactive and isocyanate-functional components are selectively reacted to form polyurethane-based polymer films according to exemplary methods of the invention. The components can be reacted in various amounts and using various methods to produce desired polyurethane-based films.

Advantageously, isocyanate-reactive and isocyanate-functional components of the invention are not reacted until polymerization is desired. This can be accomplished by, for example, adjusting chemistry of the polymerizable composition. As indicated above, further embodiments of methods of the invention comprise using one or more "blocked" components within the polymerizable composition, whereby the polymerization reaction or a further post-polymerization reaction (e.g., lamination of the polymer film to an adjacent surface) is delayed until the necessary components are unblocked.

Initiation of polymerization as desired can also be accomplished by, for example, adjusting processing techniques used to polymerize the polymerizable composition as discussed further below. One such method comprises using processing techniques whereby polymerization of the polymerizable composition occurs quickly during formation of the polymer film such that polymerization is essentially simultaneous with positioning of the then polymerizing composition into the desired film format. In the latter embodiment, in order to facilitate rapid polymerization and efficient processing of the composition, use of blocked components for initiation of the polymerization reaction itself is generally undesirable as it takes additional processing time to unblock such components. However, incorporation of blocked components for initiation of further post-polymerization reactions may be desired in certain applications according to this embodiment.

Polymerization Methods

As noted above, polymerization according to in-situ methods of the invention begins just prior to when, while, or shortly after the polymerizable composition is positioned into the desired film format. Formation of a film begins prior to completion of polymerization of the polymerizable composition. As used herein, "completion of polymerization" of the polymerizable composition such that polymerization of a film is "essentially completed" is understood to refer to a degree of polymerization at which a film's structure is sufficiently stable to allow for additional processing or storage thereof. Thereafter, the polymerizing composition is fully polymerized to form the polymer film. As used herein, the polymerizing composition is understood to be "fully polymerized" to a polymer film when its degree of polymerization renders the polymer film suitable for its intended use. Polymerization is essentially completed during or shortly after film formation. That is, once polymerization is initiated, polymerization preferably occurs quickly to maximize efficiency in methods of forming polymer films according to the invention.

When polymerization is initiated by or results in elevated temperatures (e.g., as a result of an exotherm following an endotherm that occurs after the initiation of polymerization), the then polymerizing composition should generally be positioned into the desired film format more quickly as compared to when lower processing temperatures are present. Typically, the polymerization reaction rate increases in a greater than linear manner with increasing processing temperature. Thus, if processing temperatures are too high, processing equipment may become clogged or the film formed may contain undesirable visual imperfections therein.

In order to further minimize the possibility that processing equipment will become clogged or the film formed therefrom may contain visual imperfections, conventional coating equipment can optionally be modified to facilitate unobstructed movement of the composition therethrough. Exemplary modification methods include precision grinding of surfaces contacting the polymerizing composition or coating of the same with a low surface energy composition (e.g., such as those low surface energy compositions used in release liners).

Initiation of polymerization of the polymerizable composition can be accomplished using any suitable method. Methods for initiation of polymerization can include those using external energy sources (e.g., radiation sources) or, preferably so as to optimize processing efficiency, those without use of external energy sources.

According to one embodiment, polymerization is initiated without use of an external energy source. Polymerization is initiated merely by mixing a polymerizable composition comprising multiple parts (each of which may comprise more than one premixed components) that, when separated, do not polymerize. Preferably, components necessary for polymerization of the composition are mixed just prior to forming a film therefrom. In an exemplary embodiment comprising formation of polyurethane-based films, polymerization is initiated merely by mixing isocyanate-functional and isocyanate-reactive components together with any optional components such as catalysts or chain extenders.

According to another embodiment, polymerization is initiated upon, or in conjunction with, exposure of the polymerizable composition to an external energy source. As discussed above, thermal polymerization is often preferred as compared to polymerization using other radiation sources, such as actinic radiation (e.g., e-beam) or ultraviolet radiation. According to one embodiment, exposure to the external energy source can comprise, for example, pre-heating at least one of the components of a multiple part polymerizable composition before mixing the same with the other necessary components for polymerization to occur. However, in some applications, methods other than thermal polymerization may be used. In alternative embodiments, exposure to the external energy source occurs after all of the components necessary for polymerization are mixed. For example, the polymerizable composition containing all components necessary for polymerization thereof can be exposed to an external energy source in order to initiate polymerization thereof just before, while, or shortly after forming the film.

Components of the polymerizable composition can be mixed using any suitable methodology and equipment. According to an exemplary aspect of this embodiment, components of the polymerizable composition can be fed into a metering pump and then mixing tube for metering and mixing the individual components of the polymerizable composition and subsequently dispensing the then polymerizing composition onto a substrate. When dispensed, the then polymerizing composition is simultaneously positioned into a desired film format. Any suitable method can be used to position the polymerizable or polymerizing composition into a film format. In an exemplary embodiment, conventional coating equipment is used to draw the composition into a film. Such coating equipment includes that equipment understood by those of ordinary skill in the art to be associated with, for example, spraying, curtain coating, roll coating, brush coating, slot die coating, or mandrel coating. Polymerizable composition is provided to the coating equipment using any suitable metering equipment. In a preferred embodiment, polymerizable composition is provided to a coating head using a metering pump (e.g., progressing cavity pumps, such as those available under the NEMO trade designation from NETZSCH Pumps North America, LLC of Exton, Pa. and Moyno, Inc. of Springfield, Ohio, and gear pumps) that is accurate and essentially pulseless.

In an exemplary embodiment, components of the polymerizable composition are added to a metering pump and promptly pumped into a coater (e.g., slot die) when polymerization begins. Polymerization is essentially complete by the time film formation is complete or shortly thereafter.

Polymer films may be formed contiguously with or subsequently laminated to other polymer films or layers (e.g., adhesive layers) according to further embodiments of methods of the invention. In order to support the composition in the desired film format, an underlying substrate (e.g., a web in continuous methods of the invention) is utilized in preferred embodiments of the invention. Any suitable substrate can be used as known to those of ordinary skill in the art of polymerization. For example, non-woven or woven fibrous substrates, which may or may not be removed before use of the polymer film in its intended application, as well as polymer-based substrates to which the polymer film bonds and substrates comprising low surface energy materials, which may or may not be removed before use of the polymer film in its intended application (e.g., as a tape), are exemplary substrates.

In general, methods for in-situ polymerization of polymerizable compositions according to methods of the invention can be performed in not only batch processes, but also continuous processes. For example, web-based processing equipment can be adapted for use in exemplary continuous processing methods of the invention. Polymer films can be efficiently prepared on a release-coated web, laminated with a release liner, for example, and continuously rolled onto themselves according to continuous methods of the invention. According to another embodiment of a continuous method of the invention, polymer films are prepared on a double-sided release liner and continuously rolled onto themselves without need for lamination of a top release liner on the polymer film before rolling. Due to their improved processing efficiency, continuous processes are preferred for formation of polymer films according to the invention. Further, the use of continuous processing equipment provides more processing flexibility, similar to the use of lower processing temperatures. The risk of continuous processing equipment becoming clogged or of the film so formed containing undesirable visual imperfections therein is reduced as compared to when batch processes are used.

After polymerization begins, methods of the invention can include additional processing steps associated with traditional curing of polymer films formed therefrom. Advantageously, however, any curing needed or desired is generally minimal as compared to that associated with conventional methods. For example, a web coated with a polymerizing composition according to the invention can be passed through a relatively short or lower temperature oven as compared to passing the web through longer or high temperature ovens associated with conventional on-web polymerization methodology.

FIG. 1A is a schematic representation of an exemplary continuous method and associated processing equipment 100 useful for formation of polymer films according to methods of the invention. As illustrated therein, a first release liner 102 is unwound from a first roll 104 and, preferably, partially wound onto a second roll 106 such that it passes under an applicator head 108 in its unrolled form. In addition, after being unwound from the first roll 104, but before contacting the second roll 106, the first release liner 102 is positioned such that it passes through or near optional processing equipment (such as oven 110 illustrated in FIG. 1A) as desired. Thereafter, a second release liner 112 is unwound from a third roll 114 and contacted with the first release liner 102 proximate laminator rolls 116 where lamination occurs as known to those of ordinary skill in the art. After lamination, the second release liner 112 is also wound onto the second roll 106 in the form of a laminate.

The polymerizable composition is prepared and metered to the applicator head 108 for dispensing onto the first release liner 102. According to an exemplary embodiment, once polymerization is initiated by mixing the components of the polymerizable composition and the then polymerizing composition is coated onto the first release liner 102 in a film format 118, about 5% to about 10% of the polymerization is complete. Thereafter, when operating at a web speed of about 200 feet per minute (about 60 meters per minute), prior to uptake of the film-coated release liner laminate 120 onto the second roll 106, about 80% to about 90% of the polymerization is complete. Then, once the film-coated release liner laminate 120 is in roll form, polymerization is completed. Depending on the degree of polymerization at that stage in the overall process, the rolled laminate 120 can be optionally be heated (e.g., by moving it into a heated chamber or room) to fully complete polymerization or, more typically, any post-curing processing steps desired.

Figure 1B:
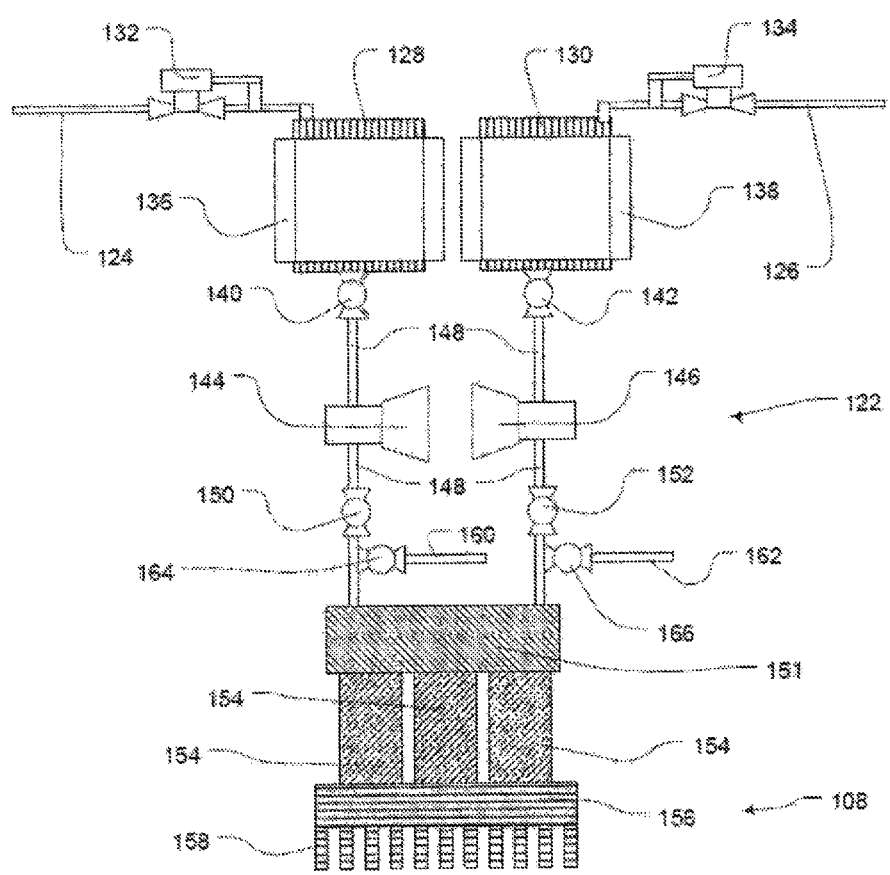
FIG. 1B is a schematic representation of the detailed method and processing equipment for formulation and dispensing of compositions into a film format within the exemplary method illustrated in FIG. 1A.

FIG. 1B is a schematic representation of the detailed method and processing equipment for formulation and dispensing of compositions into a film format 118 within the exemplary method illustrated in FIG. 1A. The details of FIG. 1B are illustrated generally in FIG. 1A as block 122.

As illustrated in FIG. 1B, first and second feed lines 124 and 126 supply components of the polymerizable composition to first process tank 128 and second process tank 130, respectively. Pressure regulating valves 132 and 134 assist in controlling the feed rate of the components into the first and second process tanks 128 and 130, respectively.

As further illustrated in FIG. 1B, each of the first process tank 128 and the second process tank 130 preferably contains a respective temperature-regulating jacket 136, 138 and associated temperature control and indication instrumentation as known to those of ordinary skill in the art so that the components therein can be, for example, optionally pre-heated as desired. The components within the first and second process tanks 128, 130 are preferably covered in an inert gas atmosphere and stored with agitation as known to those of ordinary skill in the art until passing through respective valves 140 and 142 into first metering pump 144 and second metering pump 146. Valves 140 and 142 can be any suitable type of valve (e.g., ball valves) as known to those of ordinary skill in the art.

In an exemplary embodiment, where polyurethane-based films are formed according to the method of FIGS. 1A and 1B, first process tank 128 houses the isocyanate-reactive component and catalyst while the second process tank 130 houses the isocyanate-functional component, or vice versa. These components are fed to the respective first or second metering pump 144, 146 via optionally heated feed lines 148. The optionally heated feed lines 148 contain associated temperature control and indication instrumentation as known to those of ordinary skill in the art.

Preferably, each of the first and second metering pumps 144, 146 is adjustable to provide a variety of mixtures to the manifold 151, including a typical 1:1 mixture of equal parts (although this ratio of components in the mixture can vary for optimization of properties in the resulting polymer film). Each of the first and second metering pumps 144, 146 generally includes metering rate control and indication instrumentation as known to those of ordinary skill in the art. Further, each of the first and second metering pumps 144, 146 also contains associated temperature control and indication instrumentation as known to those of ordinary skill in the art.

From the first and second metering pumps 144 and 146, the measured components are fed to the manifold 151 after passing through respective valves 150 and 152 via optionally heated feed lines 148. Valves 150 and 152 can be any suitable type of valve (e.g., ball valves) as known to those of ordinary skill in the art. Again, the optionally heated feed lines 148 contain associated temperature control and indication instrumentation as known to those of ordinary skill in the art.

As with the first and second feed tanks 128 and 130, the manifold 151 contains a respective temperature-regulating jacket 136, 138 and associated temperature control and indication instrumentation as known to those of ordinary skill in the art. The manifold 151 is heated to a temperature determinable by the method for initiating polymerization and type of polymerizable composition used.

From the manifold 151, the measured components are fed into one or more optionally heated mixing tubes 154. The mixing tubes 154 resemble small, plug flow reactors as polymerization of the polymerizable composition typically begins therein. The mixing tubes 154 are configured (e.g., in terms of their number, length, and diameter, as well as in terms of the amount of optional heat supplied to the composition passing therethrough) so that the composition flows therethrough at the desired rate. The mixing tubes 154 are also configured so that the composition exits the applicator head 108 at the desired viscosity and over a sufficient width during positioning of the composition into the desired film format 118. Suitable mixing tubes are available from commercial suppliers, such as static mixing tubes from ConProTec, Inc. of Salem, N.H. under the Statomix trade designation and meter mix equipment available from Liquid Controls (a Graco company) of North Canton, Ohio.

From the mixing tubes 154, the polymerizing composition passes into the applicator head 108. Any suitable applicator head can be used according to methods of the invention. In general, the applicator head 108 will be configured so that it dispenses material over a sufficient width to form the desired polymer film. The applicator head 108 can, optionally, be heated according to further embodiments of the invention.

In the exemplary embodiment illustrated in FIG. 1B, the applicator head 108 comprises a central reservoir 156 supplying several individual nozzles 158 with the polymerizing composition. The nozzles 158 essentially function as plug flow reactors and are configured, in terms of their number, size, and spacing, so as to provide resulting films as desired. When spaced relatively close together, the plurality of nozzles 158 preferably dispense material onto a substrate in discrete amounts that coalesce shortly after their application (e.g., duplicating the effect of a Mayer rod in a mandrel coater). The plurality of nozzles 158 will be configured so that they dispense material over a sufficient width to form the desired polymer film. The number and spacing of the plurality of nozzles 158 can vary as known to those skilled in the art.

For maintenance between continuous processes, the processing equipment is preferably cleaned according to methods known to those of ordinary skill in the art. For example, in the system illustrated in FIGS. 1A and 1B, the manifold 151 and the applicator head 108 are generally cleaned (e.g., with a suitable solvent) to remove all of the composition remaining in contact therewith. To assist in this process, solvent cleaning lines 160 and 162 are provided for supply of cleaning solvent. The solvent is supplied to the manifold 151, mixing tubes 154, and applicator head 108 via the cleaning lines 160 and 162 through respective ball valves 164 and 166.

It is to be understood that the method and processing equipment in FIGS. 1A and 1B are exemplary only. Modifications thereto can be made without departing from the spirit and scope of the invention. For example, the number of metering pumps 144, 146 illustrated in FIG. 1B can vary. When two components are mixed via metering pumps, the number of metering pumps can be more or less than two. In that regard, one metering pump can be used to dispense multiple components. Further, depending on chemistry and reaction rate of its components, a polymerizing composition may or may not require dispensing from the applicator head 108 via a plurality of nozzles 158. Alternatively, the polymerizing composition may be dispensed from the applicator head 108 via a slot die or using any other suitable coating equipment. Many other variations are possible.

EXEMPLARY COMPOSITIONS

Exemplary embodiments of the invention are described in the following non-limiting examples.

Example 1—Polyurethane Film

An amount of at least one isocyanate-reactive component (e.g., a polyol) is provided. When multiple polyols are used, the total polyol amount comprises approximately equal equivalent weights of each polyol. When used, a chain extender is added to the polyol component in an amount such that an equivalent weight ratio of about 8:1 to about 2:1 is achieved with respect to equivalent weight of the polyol. When used, a catalyst is then added to the mixture. For example, a dibutyl tin dilaurate catalyst can be added in the amount of about 0.15% based on total weight of the mixture.

To this further mixture, an isocyanate-functional component is added such that the ratio of isocyanate-functional groups to isocyanate-reactive groups in the overall mixture is about 1.2. While heating the overall mixture at a temperature of about 70° C. to about 80° C., the mixture is formed into a polymer film.

Example 2—Polyurethane Film Using Prepolymer Method

At least one isocyanate-reactive component is reacted with at least one isocyanate-functional component to form at least one polyurethane-based prepolymer (i.e., a polymer having a weight average molecular weight of less than about 50,000). At least two different prepolymers are so provided or formed. For example, a prepolymer terminated by an isocyanate-functional moiety and a prepolymer terminated by an isocyanate-reactive moiety can be formed.

In general, the isocyanate-functional group to isocyanate-reactive group ratio of the isocyanate-reactive component and isocyanate-functional component reactants is preferably about 0.3 to about 2.5, the exact value of which depends on whether, among other variables, the prepolymer so formed is to be terminated by an isocyanate-reactive moiety or an isocyanate-functional moiety. When the prepolymer is terminated by isocyanate-reactive moieties, the isocyanate-functional group to isocyanate-reactive group ratio of the reactants is preferably about 0.5. When the prepolymer is terminated by isocyanate-functional moieties, the isocyanate-functional group to isocyanate-reactive group ratio of the reactants is preferably about 1.9 to about 2.2, more preferably about 2.0 to about 2.2.

The at least two different prepolymers are then reacted, optionally with a catalyst, in approximately equal stoichiometric amounts. Depending on the chemistry of the components used and that of the prepolymers so formed, the reacted composition may then optionally be chain-extended to increase its molecular weight. At least one chain extender can be added before or after the isocyanate-functional and isocyanate-reactive prepolymers are reacted when chain extension is desired. The amount of chain extender used varies according to its chemical structure, the chemical structure of the other components within the system, and other criteria as understood by one of skill in the art.

For chain extension to occur, the mixture is generally heated. The amount and duration of heat applied to the mixture is selected such that adequate and efficient reaction of the components can occur as desired. The temperature of the mixture, or the temperature occurring during any steps where the chain extender is present and which steps occur prior to formation of the prepolymers and prepolymer reaction product, is maintained at a temperature less than that required to react the chain extender with other components present. In an exemplary embodiment, the temperature is maintained at about 60° C. or less until chain extension is desired. When a chain extender is added after the polyurethane-based prepolymer reaction product is formed, the chain extender is preferably added with agitation at about 60° C. to about 70° C., depending on viscosity of the prepolymers themselves. Once the temperature of the mixture surpasses about 90° C., the composition is then drawn into a film format. When drawing the film, any suitable release-coated substrate can be used (e.g., a silicone release coating sold under the CLEARASIL "T10" trade designation and available from CP Films, Inc. of Martinsville, Va.

or a siloxane-coated polyester film sold under the ENTRO-FILM 182 trade designation and available from entrotech, inc. of Columbus, Ohio).

Example 3

A polymerizable composition was prepared based on the components described in Table 1.

TABLE 1

| Polymerizable Composition Component | Manufacturer | Equivalent Weight of Component | Component A (pph) | Component B (parts per hundred weight polyol) | Total Weight |
|---|---|---|---|---|---|
| CAPA 2302A = a diol having a weight average molecular weight of 3,000 | Solvay Caprolactones (Cheshire, United Kingdom, now sold by Perstorp in Sweden) | 1,500 | 31.94 | N/A | 31.9% |
| CAPA 2200A = a diol having a weight average molecular weight of 2,000 | Solvay Caprolactones (Cheshire, United Kingdom, now sold by Perstorp in Sweden) | 1,000 | 21.30 | N/A | 21.2% |
| CAPA 2100A = a diol having a weight average molecular weight of 1,000 | Solvay Caprolactones (Cheshire, United Kingdom, now sold by Perstorp in Sweden) | 500 | 10.65 | N/A | 10.6% |
| 1,4-butane diol = a chain extender having a weight average molecular weight of 90 | Sigma-Aldrich Co. (St. Louis, MO) | 45 | 5.75 | N/A | 5.7% |
| Desmodur W = a diisocyanate having a weight average molecular weight of 264 | BayerMaterial-Science LLC (Pittsburgh, PA) | 132 | N/A | 30.36 | 30.3% |
| DABCO T-12 = a catalyst | Air Products and Chemicals, Inc. (Allentown, PA) | N/A | N/A | N/A | 0.3% |

Each of the components within "Component A" of the polymerizable composition was pre-heated to a temperature of about 45° C. Then, Component A was mixed with the catalyst, followed by addition of the "Component B," which was provided at room temperature (i.e., about 24° C.).

Figure 2:
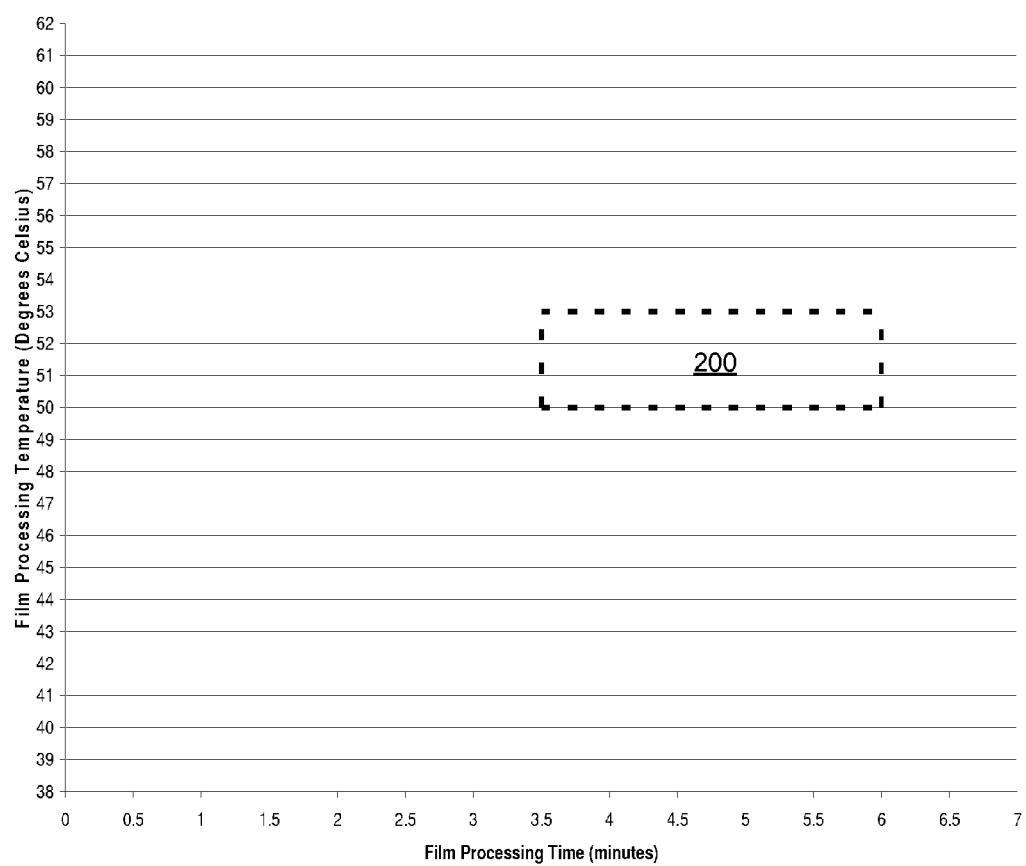
FIG. 2 is a graphical representation of film processing time versus film processing temperature useful for formation of exemplary polymer films according to the invention.

The polymerizable composition of Table 1 was batch-processed into a film format using various film processing times (in minutes) versus processing temperatures (in ° C.) as illustrated in FIG. 2. A range of such preferred processing parameters is illustrated as preferred block 200 therein. This preferred block 200 illustrates the preferred film processing temperature and time ranges in which the then polymerizing composition was found to be coatable without undesirable gelation in the processing equipment utilized. While the overall processing time will generally be greater than that of the preferred block 200, the amount of time within which the components should be mixed and positioned into a film format is illustrated as the preferred block 200.

After the composition was processed into a film format using meter-mix dispensing, the temperature of the film was increased to and/or maintained at an elevated temperature in order to fully polymerize the film. For example, a 0.006-inch (0.15-mm) thick film formed from the polymerizable composition of Table 1 was held at a temperature of about 90° C. for about 20-30 minutes to complete polymerization thereof.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language. Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

In addition, as discussed herein it is again noted that the polymerizable composition described herein may comprise all components in one or multiple parts. Further, while reference is made herein to preparation of the various intermediate components (e.g., prepolymers), recognize that some such intermediate components may be commercially available and, as such, can be used according to the invention as an alternative to otherwise preparing the same. Other variations are recognizable to those of ordinary skill in the art.

The invention claimed is:

1. A continuous method for formation of a polymer film in-situ, the method comprising steps of:
    continuously providing a polymerizable composition in one or multiple parts;
    continuously initiating polymerization of the continuously provided polymerizable composition to form a polymerizing composition, wherein polymerization is initiated without use of external energy sources;
    prior to completion of polymerization of the polymerizing composition, forming a film therefrom on a supporting substrate;
    fully polymerizing the polymerizing composition using step-growth polymerization to form the polymer film on the supporting substrate, and
    continuously rolling the formed polymer film and the supporting substrate onto itself,
wherein the polymer film is a continuous, single layer of material,
wherein the polymer film can be physically separated from the supporting substrate on which the polymer film is formed.

2. The method of claim 1, wherein the polymer film is polyurethane-based, and wherein the polymerizable composition comprises at least one isocyanate-reactive component and at least one isocyanate-functional component.

3. The method of claim 1, wherein the polymer film is formed prior to completion of polymerization of the polymerizable composition at processing temperatures up to about 200° C.

4. The method of claim 1, wherein the polymer film is formed prior to completion of polymerization of the polymerizable composition at processing temperatures of less than about 90° C.

5. The method of claim 1, wherein the polymerizable composition has a dynamic viscosity of less than about 4 Pascal-seconds (4,000 centiPoise) during formation of a polymer film therefrom.

6. The method of claim 1, wherein the polymerizable composition has a dynamic viscosity of more than about 2 Pascal-seconds (2,000 centiPoise) during formation of a polymer film therefrom.

7. The method of claim 1, wherein the polymer film has an outdoor durability of at least about two years.

8. The method of claim 1, wherein the polymer film comprises a performance film.

9. The method of claim 1, wherein the polymer film is essentially free of visual imperfections having a size of about 10 microns or greater.

10. The method of claim 1, wherein the polymer film is essentially free of visual imperfections having a size of about 5 microns or greater.

11. The method of claim 1, wherein the polymer film is essentially free of visual imperfections having a size of about 1 micron or greater.

12. The method of claim 1, wherein the polymerizable composition comprises at least one blocked component and further comprising the step of unblocking the blocked component subsequent to forming the polymer film in order to facilitate bonding between the polymer film and an adjacent surface.

13. The method of claim 1, wherein the polymer film is essentially free of unreacted solvent.

14. The method of claim 1, wherein the polymerizable composition is essentially free of solvents.

15. The method of claim 1, wherein the polymer film is formed using coating equipment comprising a precision-ground surface contacting the polymerizing composition.

16. The method of claim 1, wherein the polymer film is formed using coating equipment comprising a low surface energy composition contacting the polymerizing composition.

17. The method of claim 1, wherein components of the polymerizable composition are added to a metering pump and promptly pumped into a slot die when polymerization is initiated.

18. The method of claim 1, further comprising the step of physically separating the polymer film from the supporting substrate on which the polymer film is formed.

19. The method of claim 1, wherein the polymer film is formed on a polymer-based substrate to which the polymer film bonds.

20. The method of claim 1, wherein the polymerizable composition comprises multiple parts.

21. The method of claim 1, wherein the polymer film has a sufficient thickness to maintain its integrity as a continuous polymer layer without requiring a supporting substrate.

22. The method of claim 1, wherein the polymer film comprises a polymeric backbone having at least 80% urethane and/or urea repeat linkages formed during polymerization of the polymerizable composition.

23. The method of claim 1, wherein the polymer film is formed at processing temperatures of less than about 70° C.

24. A method for formation of a polymer film in-situ, the method comprising steps of:
    providing a polymerizable composition in one or multiple parts;
    initiating polymerization of the polymerizable composition to form a polymerizing composition;
    prior to completion of polymerization of the polymerizing composition, forming a film therefrom; and
    fully polymerizing the polymerizing composition using step-growth polymerization to form the polymer film,
wherein the polymerizable composition comprises at least one blocked component and further comprising the step of unblocking the blocked component subsequent to forming the polymer film in order to facilitate bonding between the polymer film and an adjacent surface,
wherein the polymer film is a continuous, single layer of material, and
wherein the polymer film can be physically separated from a supporting substrate on which the polymer film is formed.

25. The method of claim 24, further comprising the step of continuously rolling the formed polymer film and supporting substrate onto itself.

26. The method of claim 24, wherein the polymer film is formed on the supporting substrate and further comprising the step of physically separating the polymer film from the supporting substrate on which the polymer film is formed.

27. A method for formation of a polymer film in-situ, the method comprising steps of:
   providing a polymerizable composition in one or multiple parts;
   initiating polymerization of the polymerizable composition to form a polymerizing composition;
   prior to completion of polymerization of the polymerizing composition, forming a film therefrom; and
   fully polymerizing the polymerizing composition using step-growth polymerization to form the polymer film,
wherein the polymerizable composition comprises at least one blocked component and further comprising the step of unblocking the blocked component subsequent to forming the polymer film in order to facilitate bonding between the polymer film and an adjacent surface,
wherein the polymer film is a continuous, single layer of material,
wherein the polymer film can be physically separated from a supporting substrate on which the polymer film is formed, and
wherein polymerization is initiated without use of external energy sources.

* * * * *